(12) United States Patent
Phillips et al.

(10) Patent No.: US 10,763,537 B1
(45) Date of Patent: Sep. 1, 2020

(54) CHEMICAL METHOD TO CREATE HIGH STABILITY HETEROGENEOUS CARBON-BONDED MATERIALS

(71) Applicant: The Government of the United States of America, as represented by the Secretary of the Navy, Arlington, VA (US)

(72) Inventors: Jonathan Phillips, Pacific Grove, CA (US); Claudia C. Luhrs, Pacific Grove, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 15/625,103

(22) Filed: Jun. 16, 2017

Related U.S. Application Data

(60) Provisional application No. 62/407,787, filed on Oct. 13, 2016.

(51) Int. Cl.
  *C01B 32/336* (2017.01)
  *B05D 3/02* (2006.01)
  (Continued)

(52) U.S. Cl.
  CPC ........ *H01M 10/052* (2013.01); *B05D 3/0272* (2013.01); *C01B 31/10* (2013.01);
  (Continued)

(58) Field of Classification Search
  CPC ...... H01M 10/052; H01M 4/13; H01M 4/133; H01M 4/134; H01M 4/139; H01M 4/1393;
  (Continued)

(56) References Cited

U.S. PATENT DOCUMENTS 8,709,126 B1 * 4/2014 Luhrs .............. B22F 1/02
                                                75/351
8,894,886 B1   11/2014 Luhrs et al.
(Continued)

OTHER PUBLICATIONS

Wang et al., "A general approach for fabrication of nitrogen-doped graphene sheets and its application in supercapacitors," Journal of Colloid and Interface Science 417 (2014).
(Continued)

*Primary Examiner* — Jose I Hernandez-Kenney
(74) *Attorney, Agent, or Firm* — Naval Postgraduate School; Scott Bell

(57) ABSTRACT

The disclosure provides a method a method for generating a heterogeneous carbon-bonded material using an activated carbon support a solution comprising a material precursor and a chemical agent. The material precursor is typically a salt such as $SnCl_2$, and the chemical agent is a substance which thermally decomposes to generate reducing gases. The mixture is heated in an inert, nonreactive atmosphere to generate the reducing gases and remove surface groups from the carbon support, allowing material such as metal from the material precursor to nucleate and directly bond to the sites. The method typically utilizes high specific surface area carbon and may produce a plurality of metal particles having an average diameter of less than about 20 nm dispersed on and strongly bonded to the underlying carbon support.

19 Claims, 13 Drawing Sheets

(51) Int. Cl.
H01M 10/052 (2010.01)
H01M 4/66 (2006.01)
C01B 31/10 (2006.01)
H01M 4/38 (2006.01)

(52) U.S. Cl.
CPC ........... *C01B 32/336* (2017.08); *H01M 4/387* (2013.01); *H01M 4/663* (2013.01); *C01P 2006/12* (2013.01); *C01P 2006/40* (2013.01)

(58) Field of Classification Search
CPC .... H01M 4/1395; H01M 4/387; H01M 4/663; C01B 32/336; C01B 31/10; B05D 3/0272; C01P 2006/12; C01P 2006/40
See application file for complete search history.

(56) References Cited

U.S. PATENT DOCUMENTS

| 9,308,585 | B2 | 4/2016 | Leseman | |
|---|---|---|---|---|
| 2004/0202937 | A1* | 10/2004 | Barker | H01M 4/485 429/231.95 |
| 2005/0250863 | A1 | 11/2005 | Green et al. | |
| 2006/0093915 | A1* | 5/2006 | Lundquist | H01G 9/058 429/231.8 |
| 2012/0045687 | A1* | 2/2012 | Wang | C04B 35/532 429/163 |
| 2017/0120223 | A1* | 5/2017 | Sokolovskii | B01J 35/0006 |

OTHER PUBLICATIONS

Hassoun et al., "A Nanostructured Sn—C Composite Lithium Battery Electrode with Unique Stability and High Electrochemical Performance," Adv. Mater. 20 (2008).
Teng et al., "Activation Energy for Oxygen Chemisorption on Carbon at Low Temperatures," Ind. Eng. Chem. Res. 38 (1999).
Dastgheib et al., "Adsorption of oxygen by heat-treated granular and fibrous activated carbons," Journal of Colloid and Interface Science 274 (2004).
Soliman et al.,"Aerosol Synthesis of Nano and Micro-scale Zero Valent Metal Particles from Oxide Precursors," LA-UR-10-04206, available at http://permalink.lanl.gov/object/tr?what=info:lanl-repo/lareport/LA-UR-10-04206, last accessed Aug. 10, 2016.
Phillips et al., "Calorimetric study of oxygen adsorption on activated carbon," Thermochimica Acta 312 (1998).
Chen et al., "Effect of Support Pretreatments on Carbon-Supported Fe Particles," J. Phys. Chem. 91 (1987).
Tian et al., "High capacity group-IV elements (Si, Ge, Sn) based anodes for lithium-ion batteries," Journal of Materiomics 1 (2015).
Mercier et al., "Influence of the C/Sn Ratio on the Synthesis and Lithium Electrochemical Insertion of Tin-Supported Graphite Materials Used as Anodes for Li-Ion Batteries," International Journal of Electrochemistry, vol. 2011, Article ID 381960, doi:10.4061/2011/381960 (2011).
Floess et al., "Kinetics of Oxygen Chemisorption on Microporous Carbons," Energy &Fuels 5 (1991).
Park et al.,"Li-alloy based anode materials for Li secondary batteries," Chem. Soc. Rev. 39 (2010).
Luhrs et al., "Novel Process for Solid State Reduction of Metal Oxides and Hydroxides," Metallurgical and Materials Transactions B 44 (2013).
Canty et al., "Reduction Expansion Synthesis as Strategy to Control Nitrogen Doping Level and Surface Area in Graphene," Materials 8 (2015).
Zea et al.,"Reductive/expansion synthesis of zero valent submicron and nanometal particles," J. Mater. Res. 26(5) (2011).
Chen et al.,"Searching for electrode materials with high electrochemical reactivity," Journal of Materiomics 1 (2015).
Lee et al.,"Synthesis of Tin-Encapsulated Spherical Hollow Carbon for Anode Material in Lithium Secondary Batteries," J. Am. Chem. Soc. 125 (2003).
Lowell et al., Reduction expansion synthesis for magnetic alloy powders, (masters thesis, Naval Postgraduate School, 2015).
Winter et al., "Electrochemical lithiation of tin and tin-based intermetallics and composites," Electrochimica Acta 45 (1999).
Courtney et al., "Electrochemical and in Situ X-Ray Diffraction Studies of the Reaction of Uthium with Tin Oxide Composites," J. Electrochem. Soc. 144 (1997).
Zhang et al., "Tin-Nanoparticles Encapsulated in Elastic Hollow Carbon Spheres for High-Performance Anode Material in Lithium-Ion Batteries," Adv. Mater 20 (2008).
Menendez et al., "On the Modification and Characterization of Chemical Surface Properties of Activated Carbon: In the Search of Carbons with Stable Basic Properties," Langmuir 12 (1996).
Phillips et al., "Microcalorimetric Study of the Influence of Surface Chemistry on the Adsorption of Water by High Surface Area Carbons," J. Phys. Chem. B 104 (2000).
Phillips et al., "Iron Pentacarbonyl Decomposition over Grafoil. Production of Small Metallic Iron Particles," J. Phys. Chem. 84 (1980).
Baker et al., "Filamentous Carbon Formation Over Iron Surfaces," ACS Symp. Ser. 202 (1982).
Hegenberger et al., "Evidence of Strong Interaction between Iron Particles and an Activated Carbon Support," J. Phys. Chem. 91 (1987).
Tessmer et al., "Impact of Oxygen-Containing Surface Functional Groups on Activateed Carbon Absorption of Phenols," Environ. Sci. Technol. 31 (1997).
Boehm, "Surface oxides on carbon and their analysis: a critical assessment," Carbon 40 (2002).
Lázaro et al, Study and Application of Carbon Black Vulcan XC-72R in Polymeric Electrolyte Fuel Cells, in Carbon Black: Production, Properties and Uses (2011).

* cited by examiner

CHEMICAL METHOD TO CREATE HIGH STABILITY HETEROGENEOUS CARBON-BONDED MATERIALS

RELATION TO OTHER APPLICATIONS

This patent application claims priority from provisional patent application 62/407,787 filed Oct. 13, 2016, which is hereby incorporated by reference in its entirety.

FIELD OF THE INVENTION

One or more embodiments relates to a method for generating a heterogeneous carbon-bonded material using a mixture comprising a material precursor, chemical agent, and an activated carbon through thermal decomposition of the chemical agent.

BACKGROUND

Significant efforts are being devoted to development of durable metal-carbon based materials for use as electrodes in lithium-ion batteries. Generally, the effective life of these electrodes is limited by the pulverization of these particles due to the high volumetric change during lithiation and delithiation cycles, which leads to particles pulverization and destabilization of solid electrolyte interphase (SEI) films, resulting in fast capacity fading and low Coulombic efficiency.

Much effort has been focused on creating conductive metal oxide/graphene composites, structured in such a fashion that the metal oxides are physically prevented from crumbling. For example, there are many studies focused on $Fe_3O_4$ mixed/fixed on different conductive forms of carbon because iron oxide not only has a potentially high maximum capacity, 922 mAh/g, but also meets conductivity, cost and environmental objectives. This is far better than that of the graphite electrode, 372 mAh/g, due to the final Stage 1 structuring Li/C stoichiometry of $LiC_6$. Another material, with an even higher 'theoretical' capacity, lower operating potential than metal oxides for enhanced full cell energy density, and decreased voltage hysteresis due to the alloying storage mechanism, is metallic Sn. The final stoichiometry of Li/Sn, $Li_{22}Sn_5$ has a high lithium packing density (75.47 mol $L^{-1}$), which is nearly as high as that of pure lithium metal (76.36 mol $L^{-1}$). This packing density yields a theoretical ~990 mAh/g for Sn. However; like the other alternatives to graphite, Sn is not employed because of the mechanical pulverization which leads to rapid deterioration of capacity with cycling. In particular, Sn expands so significantly (~360%) during lithiation, and then shrinks during charging, that it physically pulverizes during cycling, creating an unstable and unusable electrode. Specifically, disintegration leads to a rapid drop in capacity with cycling and excessive solid electrolyte interphase (SEI) formation, rapidly consuming electrolyte and increasing electrode resistance. As with magnetite, novel approaches to mitigate the crumbling that accompanies expansion during lithiation have been tried. For example, the encapsulation of Sn within nano-scale conductive carbon structures, with void space to accommodate expansion without concomitant breakage, yields high initial capacity, and improved, but still not sufficient, stability with cycling. Additionally, scalable fabrication and material cost are also the key issues for practical application of energy storage devices.

It would be advantageous to provide a rapid synthesis process for the generation of a heterogeneous carbon-bonded material using materials which are standard and inexpensive. This would offer significant economic advantages over other more intricate synthetic approaches requiring expensive/exotic materials. It would be particularly advantageous if a variety of species such silicon (Si), germanium (Ge), and tin (Sn) considered potentially valuable for creating high capacity Li ion battery anodes could be produced as small, stable particles on relatively inexpensive forms of carbon.

These and other objects, aspects, and advantages of the present disclosure will become better understood with reference to the accompanying description and claims.

SUMMARY

The disclosure provides a method for method for generating a heterogeneous carbon-bonded material using a chemical process. The method activates a carbon support using an oxydizing agent such as air in order to generate oxygen groups on the carbon substrate and greatly mitigate or eliminate hydrophobicity, followed by mixing the activated carbon with a solution comprising a material precursor and a chemical agent. The material precursor is typically a salt comprising a metal such as $SnCl_2$, and the chemical agent is a substance such as urea which thermally decomposes to generate reducing gases such as CO, $H_x$, $NH_x$, or mixtures thereof. The mixture is heated to a first temperature below the decomposition temperature of the chemical agent in order to drive off some portion of the solution solvent, followed by heating in an inert, nonreactive atmosphere at a temperature greater than the decomposition temperature of the chemical agent and the material precursor. Decomposition of the chemical agent generates reducing gases which remove the surface groups from the carbon support leaving metal nucleation sites having dangling bonds, allowing material such as metal from the material precursor to nucleate and bond to the sites.

The method typically produces a plurality of particles having an average diameter of less than about 20 nm dispersed on and strongly bonded to the underlying carbon support. In typical embodiments the particles are metal particles. In certain embodiments the method generates nanoparticles particles comprised of metallic tin (Sn) strongly bonded to the carbon support. Such a material has high use in certain applications, such as an electrode material for Li+ and other batteries which operate through lithiation/delithiation processes.

The novel apparatus and principles of operation are further discussed in the following description.

Figure 1:
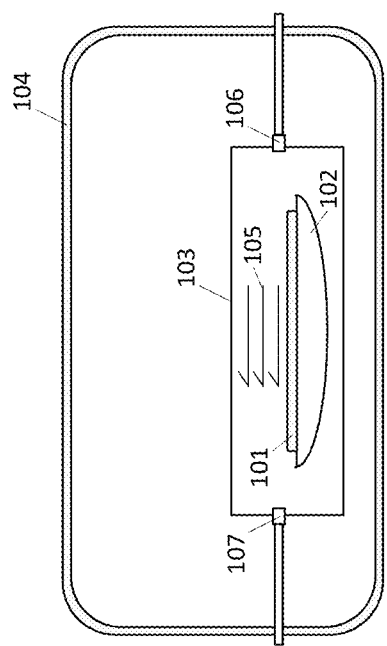
FIG. 1 illustrates an apparatus for conduct of an embodiment of the method.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for generating a metal-carbon bonded material using a mixture comprising a metal precursor, chemical agent, and an activated carbon through thermal decomposition of the chemical agent.

The disclosure provides a method for generating a heterogeneous carbon-bonded material using a chemical process. The method utilizes various steps as disclosed in order effectuate formation of small non-carbon particles generally less than about 20 nm in diameter bonded to an underlying carbon support. In particular embodiments, the non-carbon particles comprise metal particles. The method activates a carbon support using an oxidizing agent such as an oxygen-comprising gas in order to generate carbon-oxygen surface functional groups on the carbon substrate and greatly mitigate or eliminate hydrophobicity, followed by mixing the activated carbon with a solution comprising a material precursor and a chemical agent. In certain embodiments when the process is intended to create a metal particle, the material precursor may be a salt such as Tin(II) Chloride (SnCl$_2$), and the chemical agent may be a substance such as urea which thermally decomposes to generate reducing gases such as CO, H$_x$, NH$_x$, or mixtures thereof. Reducing the hydrophobicity of the carbon support through generation of oxygen groups on the substrate allows the material precursor solution to permeate the typically high specific surface area carbon support and achieve close proximity among the material precursor solution, the chemical agent, and potential nucleation sites on the carbon support occupied by the oxygen groups. The mixture is then heated in an inert, non-reactive atmosphere. Typically the mixture is heated at a first temperature below the decomposition temperature of the chemical agent in order to drive off some portion of the solution solvent and concentrate the material precursor (for example, a metal precursor) and chemical agent, followed by heating in an inert, nonreactive atmosphere at a temperature greater than the decomposition temperature of the chemical agent and the material precursor. Decomposition of the chemical agent generates reducing gases which remove the oxygen groups from the carbon support leaving unsaturated carbon atoms in the surface—that is the process creates dangling bonds in the carbon surface—allowing atoms present in the material precursor (for example, metal atoms) to nucleate and bond to the sites. The result is metal or other species from the material precursor directly and strongly bonded to carbon atoms in the surface. These bonds will be strong enough to prevent the movement and sintering of atoms, particularly atoms bonded to the carbon substrate In certain embodiments, the precursor solution is mixed with a carbon support having a specific surface area of at least 20 m$^2$/g and a total pore volume of at least 0.3 cm$^3$/g, such as a carbon black. The use of high specific surface area carbon may provide a high number of metal-carbon bonding sites, and the strength of the metal-carbon bond generated greatly restricts metal particle mobility and significantly mitigates any propensity for sintering during the process or subsequent growth during operations as, for example, a battery electrode material. The method typically produces a plurality of particles having an average diameter of less than about 20 nm dispersed on and strongly bonded to the underlying carbon support. In typical embodiments, the carbon support comprises an aggregation of primary particles having diameters greater than about 20 nm and less than about 500 nm. See e.g. Lázaro et al, *Study and Application of Carbon Black Vulcan XC-72R in Polymeric Electrolyte Fuel Cells*, in Carbon Black: Production, Properties and Uses (2011), among others. In particular embodiments the method generates metal nanoparticles strongly bonded to the carbon support. In certain embodiments, the method generates metallic tin (Sn) strongly bonded to the carbon support. Such a material has high use in certain applications, such as an electrode material for Li+ and other batteries which operate through litiation/delitithiation or related battery processes such as those for which alkali metals other than Li are employed. In further embodiments, the heterogeneous carbon-bonded material produced is mixed with a binder and spread over a surface of a conducting substrate, to facilitate subsequent production of a conducting device such as an electrode. In certain embodiments, the material precursor comprises at least one of Sn, Si, or Ge and the carbonaceous material has a specific surface area of at least 20 m$^2$/g and a total pore volume of at least 0.3 cm$^3$/g, and use of the high surface area carbon in conjunction with the metal precursor and precursor solution generates a heterogeneous carbon-bonded material comprising metal particles of Si, Sn, and/or Ge of less than about 20 nm bonded to the high surface area carbon, and the resulting heterogeneous carbon-bonded material is mixed with a binder and spread over a surface of a substrate having an electrical conductivity greater than 10$^3$ S/cm, to facilitate production of an electrode having high stability and capacity.

In some embodiments, the solvent comprising the precursor solution is a liquid wherein the material precursor has a solubility of at least 10 grams per 100 ml solvent at 0° C. In a particular embodiment, the precursor solution is an aqueous solution comprising water as a solvent and the material precursor and chemical agent as solutes. Typically the carbon support is a plurality of particles and mixing stimulates impregnation into and close contact between the precursor solution and the activated carbon. The mixture is subsequently heated in inert environments, first at a first temperature greater than 100° C. and less than the decomposition temperatures of the chemical agent and the material precursor to eliminate some portion of the water solvent, and subsequently at a second temperature exceeding the decomposition temperatures in order to generate reducing gases, reduce the oxygen groups from the carbon support, and allow the metal from the metal precursor to nucleate on sites formerly occupied by the oxygen groups. In certain embodiments the chemical agent is a compound that generates CO, $H_x$, $NH_x$, or mixtures thereof as reducing gases upon thermal decomposition. In a typical embodiment, the chemical agent comprises $NH_z$, where $z \geq 1$. In other embodiments, the second temperature is from about 400° C. to about 1200° C. In a specific embodiment the material precursor comprises Sn and an anion such as chloride, acetate, formate, nitrate, chloride, sulfate, oxy-chloride, phosphate, and others, and the resulting material comprises a carbon support with a plurality of Sn metal particles of average diameter less than about 20 nm strongly bonded to the carbon support. Typically the inert, nonreactive atmosphere present during the heating comprises nitrogen, argon, helium, other noble gases, or mixtures thereof.

The method disclosed may be conducted in any suitable apparatus. One particular apparatus is illustrated at FIG. 1, with mixture 101 comprising activated carbonaceous material and metal precursor solution loaded into a vessel 102. Vessel 102 is placed within a reactor 103 such as a quartz tube and surrounded by furnace 104. Furnace 104 provides heating as described while reactor 103 provides atmospheres such as 105 via gas flow through inlet 106 and outlet 107.

Figure 2:
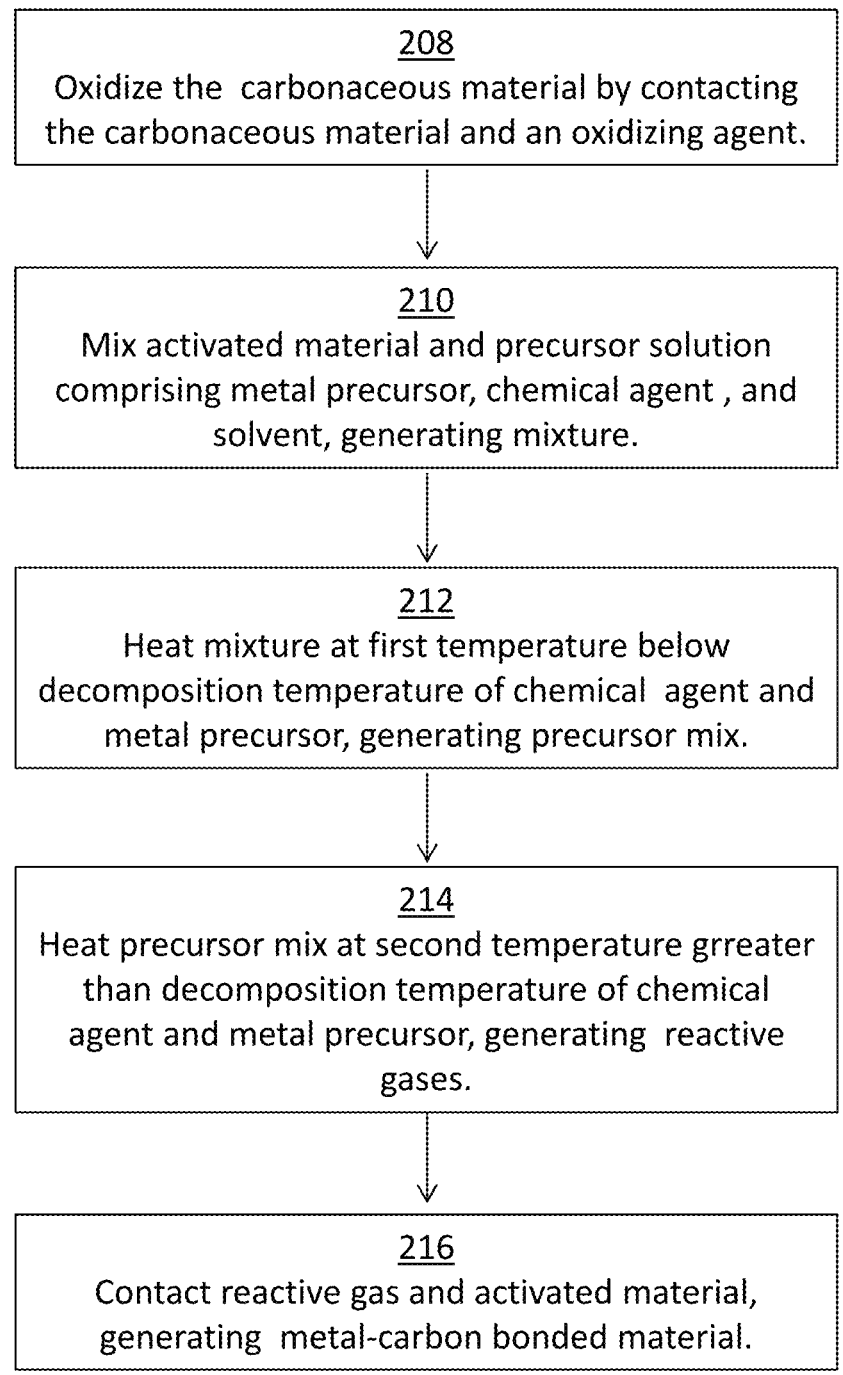
FIG. 2 illustrates an embodiment of the disclosed methodology.

Typical steps comprising the disclosed methodology are illustrated at FIG. 2. At step 208, a carbonaceous material comprising carbon is oxidized using an oxidizing agent in order to generate carbon-oxygen surface functional groups on the carbon comprising the carbonaceous material. In a particular embodiment, the carbonaceous material is oxidized by heating the carbonaceous material to a temperature of at least 250° C. in an atmosphere comprising oxygen, in order to provoke formation of oxygen comprising groups on the carbon support. In certain embodiments the carbonaceous material is heated in air, and in other embodiments hearted to a temperature between 400° C. and 700° C. The carbonaceous material is heated for a sufficient time to generate carbon-oxygen surface functional groups on the carbon comprising the carbonaceous material. For a given carbonaceous material, a sufficient time at temperature may be determined using means known in the art, such as Temperature Programmed Oxidation (TPO). See e.g., Floess et al., "Kinetics of Oxygen Chemisorption on Microporous Carbons," *Energy&Fuels* 5 (1991), among others. In certain embodiments, the carbonaceous material is heated for at least ten minutes in order to generate the carbon-oxygen surface functional groups. As is understood, if carbon is heated for an excessive time and temperature, significant carbon can be lost to the surroundings with $CO_2$ and sometimes CO formation beginning generally around at temperatures higher than about 700° C. In certain embodiments, the carbonaceous material comprises a carbon support having a specific surface area of at least 20 $m^2/g$, in other embodiments at least 80 $m^2/g$, and in other embodiments at least 150 $m^2/g$. In certain embodiments, the carbon support has a total pore volume of at least 0.3 $cm^3/g$. In some embodiments carbon comprises at least 50 wt. % of the carbonaceous material, in other embodiments at least 70 wt. %, and in other embodiments at least 90 wt. %.

The oxidizing agent may any gas, liquid, or solid which acts to generate the carbon-oxygen surface functional groups on the carbonaceous material. Carbon-oxygen surface functional groups on carbon surfaces are known in the art and may comprise compounds such as carboxylic acid/anhydride, carbonyl, ether, ester, aldehyde, pyrone, and hydroxyl groups, among others. Additionally, carbon-oxygen surface functional groups generated by a given oxidizing agent may be characterized using means known in the art, such x-ray photoelectron spectroscopy (XPS), infrared spectroscopy (IR), temperature programmed desorption (TPD), titration, and others. See e.g. Boehm, "Surface oxides on carbon and their analysis: a critical assessment," *Carbon* 40 (2002), among others.

Initial activation of the carbon comprising the carbonaceous material as described is a significant step for the subsequent creation of strong material-carbon bonds in the method disclosed. Without oxidation such as high temperature treatment in an oxygen-comprising environment to provoke chemisorption and formation of carbon-oxygen surface functional groups on the carbon support, bonding of material precursor atoms to the carbon surface during subsequent steps of the process will generally occur through oxygen linkages, generating for example metal oxides rather than metallic particles bonded to the carbon support. Metals bonded through such metal-oxygen-carbon arrangements are known to move easily, leading to rapid sintering, a high proportion of metal oxides, and the highly limited or absent presence of purely metallic particles. In contrast, activation of the carbon support as described generates substantial saturation of the surface of the carbon with oxygen groups, greatly mitigating the hydrophobic nature of the underlying support. This significant mitigation generates hydrophilic conditions at carbon sites and allows proper dispersion of the precursor solution via surface wetting, placing the metal precursor and chemical agent in close proximity to potential metal bonding sites. During subsequent steps of the process, surface radicals are produced by the removal of surface oxygen species via the interaction of these surface atoms with reducing gases formed by thermal decomposition of the chemical agent. The removal of the oxygen concomitantly leads to the creation of dangling carbon bonds that react strongly with atoms of the material comprising the material precursor, producing unique and strong bonds between the material atoms and carbon support.

Figure 3:
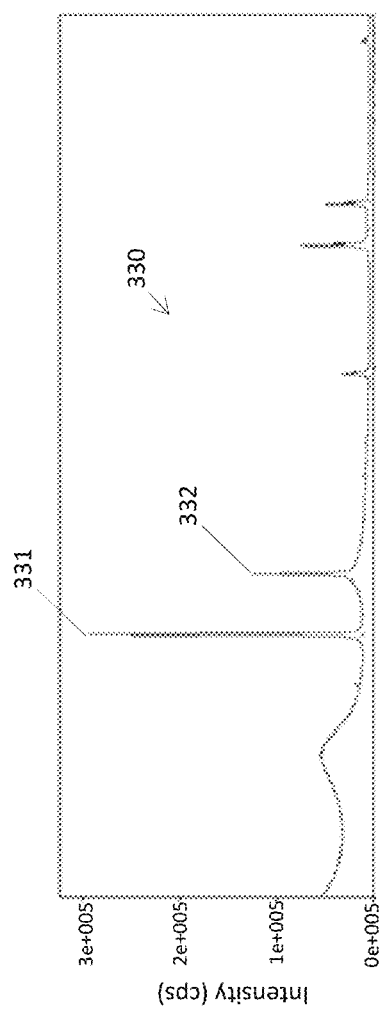
FIG. 3 illustrates an exemplary XRD pattern on a non-activated carbon substrate.
Figure 4:
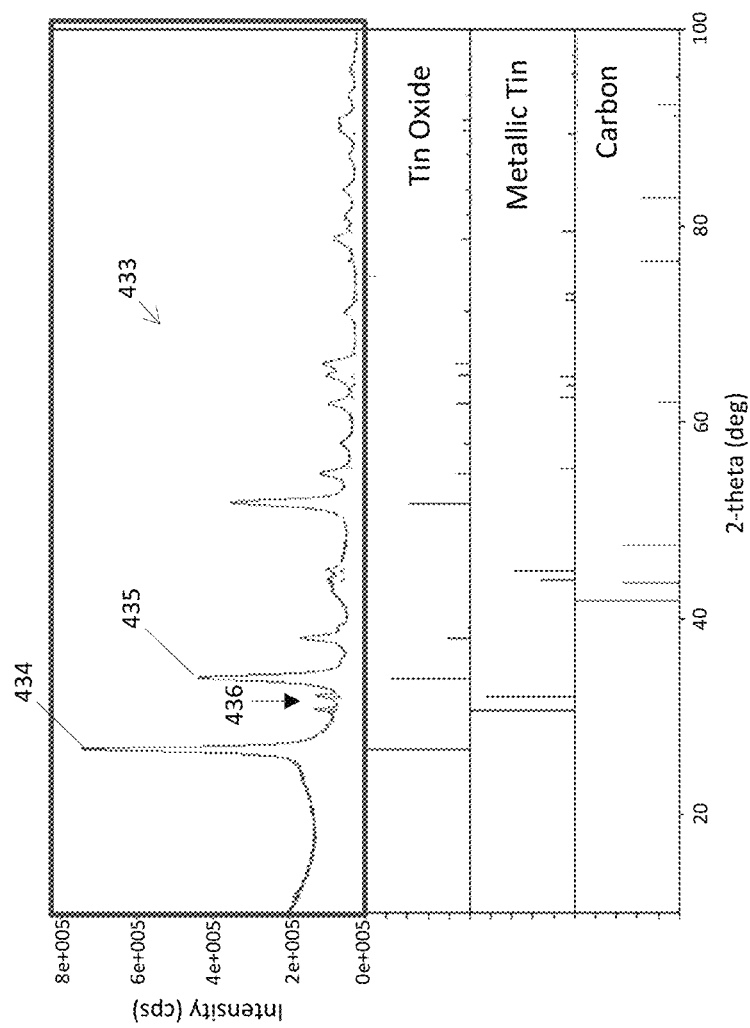
FIG. 4 illustrates an exemplary XRD pattern on an activated carbon substrate.

The significance of the activation on the final produce is illustrated by comparison of FIGS. 3 and 4. FIG. 3 illustrates an XRD result from forming particles on a carbon support using a aqueous solution comprising a $SnCl_2$ material precursor and urea as the chemical agent in a 1:1 molar ratio, and where the carbon support was not activated. As shown, the trace generally indicated at 330 demonstrates peaks 331 and 332 indicating the presence of $SnO_2$, however metallic Sn is not indicated. In contrast, FIG. 4 illustrates an XRD trace generally at 433 resulting from the disclosed method using the $SnCl_2$ material precursor and urea in a 1:1 molar ratio and utilizing an activated support as described. 2-theta values corresponding to Tin Oxide, Metallic Tin, and Carbon are additionally indicated. As shown, trace 433 demonstrates peaks generally indicated at 436 indicating the formation of metallic Sn, in addition to peaks 434 and 435 indicating $SnO_2$. Comparison of FIGS. 3 and 4 indicates the significance of the activation step of the disclosed methodology for the synthesis of metallic particles bonded to the carbon substrate. Additionally, although FIG. 4 indicates significant $SnO_2$ presence, increasing molar ratios of chemical agent to material precursor as well as the use of higher specific surface area carbon supports may tend to greatly increase the presence of metallic particles and mitigate or substantially eliminate the presence of metal oxide particles, as will be discussed.

At step 210 of FIG. 2, the activated material is mixed with a precursor solution. As discussed, the precursor solution comprises a material precursor and a chemical agent as a solute and further comprises a solvent. In embodiments, the precursor solution is an aqueous solution utilizing water as the solvent. In certain embodiments, the material precursor is a metal precursor comprising a metal and is typically a salt, with the metal acting as a cation in combination with an anion of chloride, acetate, formate, nitrate, chloride, sulfate, oxy-chloride, phosphate, and others. The metal comprising a metal precursor can include virtually any metal, such as, for example, transition metals in Groups 11, 12, 15, 16 and/or 17 in the periodic table, alkali metals in Group 1, and alkali earth elements in Group 2, but not limited to those. In a particular embodiment, the metal comprising a metal precursor is a group 14 element such as Si, Ge, or Sn. In another embodiment, the metal is Sn, and in an additional embodiment, the metal precursor is $SnCl_2$. The chemical agent is an agent which produces reducing gases comprising CO, $H_x$, $NH_x$, or mixtures thereof on thermal decomposition. The chemical agents can include, but are not limited to, nitrogen-hydrogen (N—H) containing molecules such as urea [$(NH_2)_2CO$], ammonia ($NH_3$), a compound containing —$NH_2$ or —NH, etc. For example, urea can be decomposed to generate species including CO, $H_x$, and $NH_x$ groups, which are active and ready for reduction reactions. The chemical agents can also include those present in nature to generate reducing species upon decomposition. In certain embodiments, the precursor solution has a molar ratio of chemical agent to material precursor of greater than 0.5:1 to less than 10:1. Solvent may be present in the precursor solution to the degree necessary to accomplish adequate solution and subsequent mixing. Within the solvent of the precursor solution, the material precursor and chemical agent may be fully soluble or partially soluble, as those terms are used in the art.

At step 210, the activated material and precursor solution may be mixed using any means known in the art, for example mortar-and-pestle, ultrasonic, continuous mixers, and others. Typically the resulting mixture has a paste-like consistency and comprises a plurality of carbonaceous material particles.

At step 212 of FIG. 2, the mixture is heated at a first temperature and in an inert atmosphere to drive off some portion of the solvent comprising the precursor solution and further concentrate the material precursor and chemical agent. The first temperature is less than the decomposition temperature of the material precursor and less than a decomposition temperature of the chemical agent. In certain embodiments where the solvent is water and the precursor solution is an aqueous precursor solution, the first temperature is greater than 100° C. The inert atmosphere is typically chemically inactive with one or more of the carbon comprising the activated material, the carbon-oxygen surface functional groups formed on the activated material, and the material precursor and chemical agent of the precursor solution. In some embodiments an inert gas comprises at least 90 volume percent of the inert atmosphere, and in other embodiments the inert gas comprises $N_2$, He, Ar, Kr, or other generally inert gases known in the art. Other inert gases which are chemically inactive with the carbon comprising the activated material, the surface radicals formed on the activated material, and the material precursor and chemical agent of the precursor solution may be utilized.

At step 214, the precursor mix generated at 212 is heated to a second temperature in an unreactive atmosphere. The second temperature is greater than the decomposition temperature of the chemical agent and the material precursor, and less that the combustion temperature of the activated material. In typical embodiments, the second temperature is additionally less than the melting temperature of the material comprising the material precursor. The unreactive atmosphere may be the same or similar to the inert atmosphere of step 212, and is chemically inactive with one or more of the carbon comprising the activated material, the surface radicals formed on the activated material, and the material precursor and chemical agent of the precursor solution. In some embodiments, the second temperature is greater than 400° C. and less than 1200° C., and in other embodiments less than 700° C. The heating temperature and the time length are not limited according to various embodiments. In embodiments, the heating temperature and the time length can be chosen to insure the full decomposition of the chemical agent and corresponding production of reaction gas.

At step 216, the reactive gas generated at 214 contacts the activated material and the process generates the heterogeneous carbon-bonded material, where the heterogeneous carbon-bonded material comprises carbon from the carbonaceous material and the material from the material precursor. Contact between the reducing gases and the activated material provokes a reduction process removing the surface groups on the activated carbon surface, allowing particles produced by the thermal decomposition of the material precursor to strongly and directly bond to carbon atoms comprising the carbon support. Consequently, the particles strongly attach to the dangling bonds after the removal of the surface groups. Additionally, the solvent comprising the precursor solution will assist in dissolution and delivery of the material precursor, such that upon decomposition by heating, material precursor density is generally the same on all carbon surfaces. This aids in the production of small particles homogeneously after reduction.

In some embodiments, the precursor mix is heated to the second temperature by exposure to a heated inert atmosphere such as 105 in reactor 103. In other embodiments, reaction gases generated by contact between the reducing gases and surface groups on the activated material are exhausted from reactor 103. Generally, at lower exhausting flow rates, the reducing gases generated by the decomposition of the chemical agent are resident in the area of the surface groups for a longer period, generating more dangling bonds on the carbon substrate and permitting more material such as metal to bond. Higher flow rates may tend to flush the reducing gases out of the reactor before they have time to fully react with the surface groups. In a particular embodiment, a flow of inert gas is maintained over the precursor mix such that a gas flow through reactor 103 and over the precursor mix is less than 50 standard cubic centimeters per minute (sccm), in some embodiments less than 20 sccm, and in other embodiments less than 10 sccm.

Figure 5:
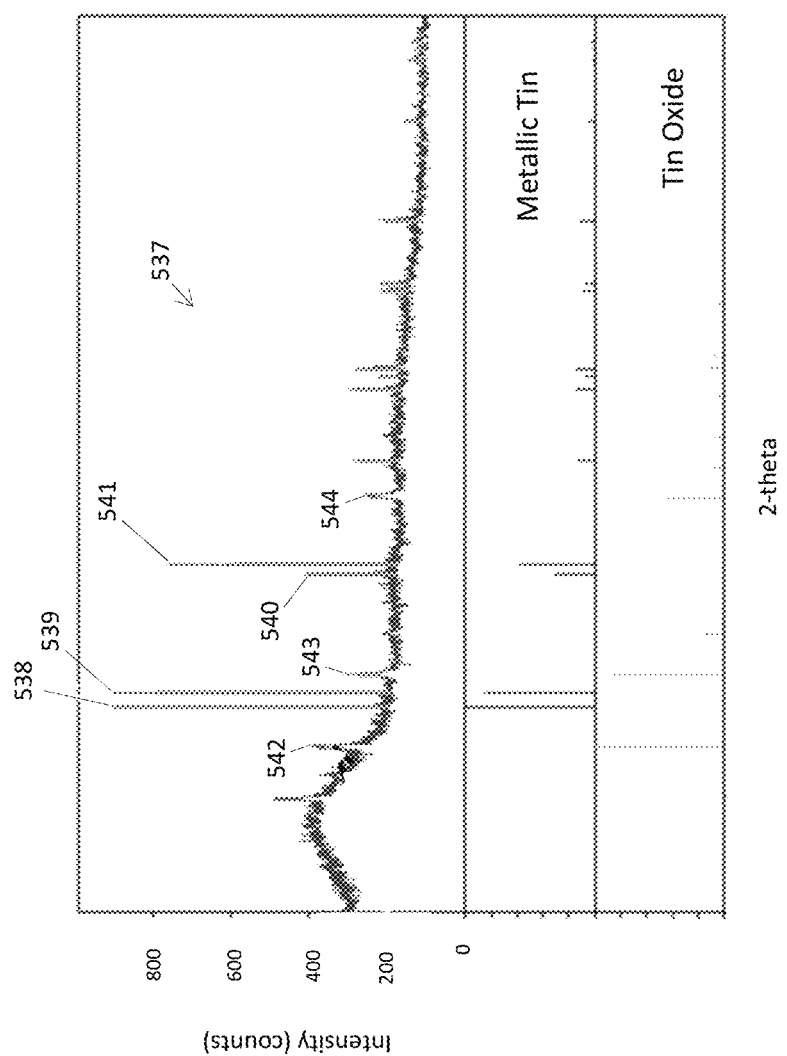
FIG. 5 illustrates an exemplary XRD pattern of another embodiment on an activated carbon substrate.
Figure 6:
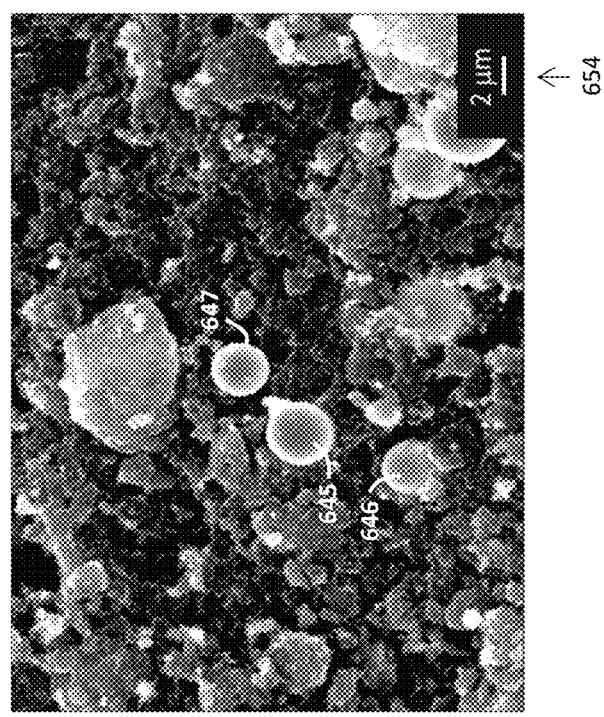
FIG. 6 illustrates an image of a first embodiment generated by the method.

As previously mentioned the precursor solution may have a molar ratio of material precursor to chemical agent over a variety of ranges, however in certain embodiments the material precursor to chemical agent molar ratio is at least 1:1, in other embodiments at least 1:1.5, and in other embodiments at least 1:2. An increase in the molar ratio may generally assist in diminishing the presence of oxide particles such as metal oxides and increasing the presence of material particles such as metal particles. Comparison of FIGS. 4 and 5 illustrates the potential impact. As discussed, FIG. 4 illustrates a result of the method disclosed with $SnCl_2$ and urea present in the precursor solution in a 1:1 molar ratio. Although Sn metallic particles are present at 436 by virtue of the activated support, significant $SnO_2$ is indicated at 434 and 435. In contrast, FIG. 5 illustrates the results of an $SnCl_2$ material precursor and urea chemical agent on an activated support with the $SnCl_2$ and urea present in a 1:2 molar ratio, with 2-theta corresponding to Metallic Tin and Tin Oxide additionally indicated. XRD trace 537 illustrates a much greater presence of Sn relative to $SnO_2$, as evidenced by comparison of Sn peaks 538, 539, 540, and 541 compared to $SnO_2$ peaks such as 542, 543, 544, and others present. FIG. 6 illustrates imaging of the material of FIG. 5 shown with a scale of 2 μm indicated generally at 654. As indicated, the resulting spherical metallic tin particles such as 645, 646, and 647 have diameters on the order of microns.

In certain applications of the method such as production of material for battery electrodes, micron-sized metal particles may generally not be desired due to performance degradation during operation. In particular, Sn expands so significantly (~360%) during lithiation, and then shrinks during charging, that larger Sn particles may physically pulverize the material during cycling, creating an unstable and unusable electrode. Specifically, disintegration leads to a rapid drop in capacity with cycling and excessive solid electrolyte interphase (SEI) formation, rapidly consuming electrolyte and increasing electrode resistance. Smaller, nanometer sized particles and particularly those strongly bound to the underlying carbon support as provided by the disclosed method are generally more complementary to continued material integrity given the volumetric expansions expected.

Figure 8:
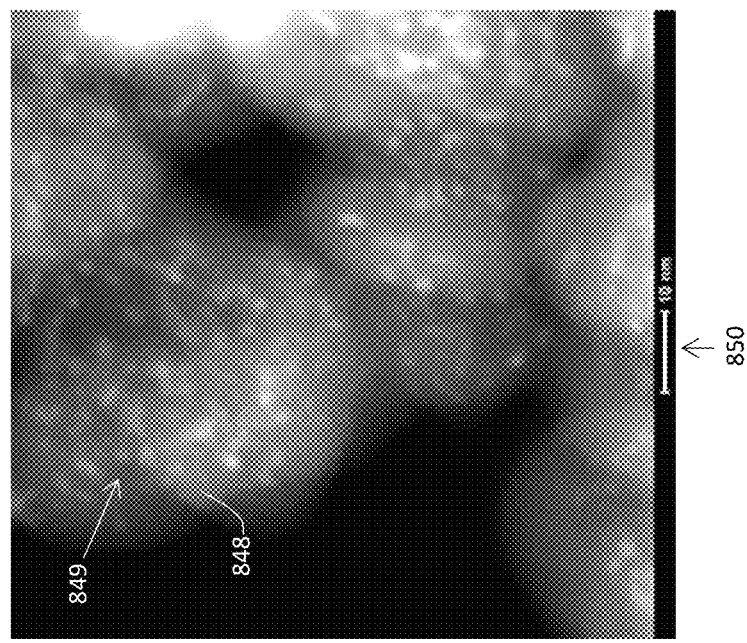
FIG. 8 illustrates another image of the embodiment of FIG. 7.
Figure 7:
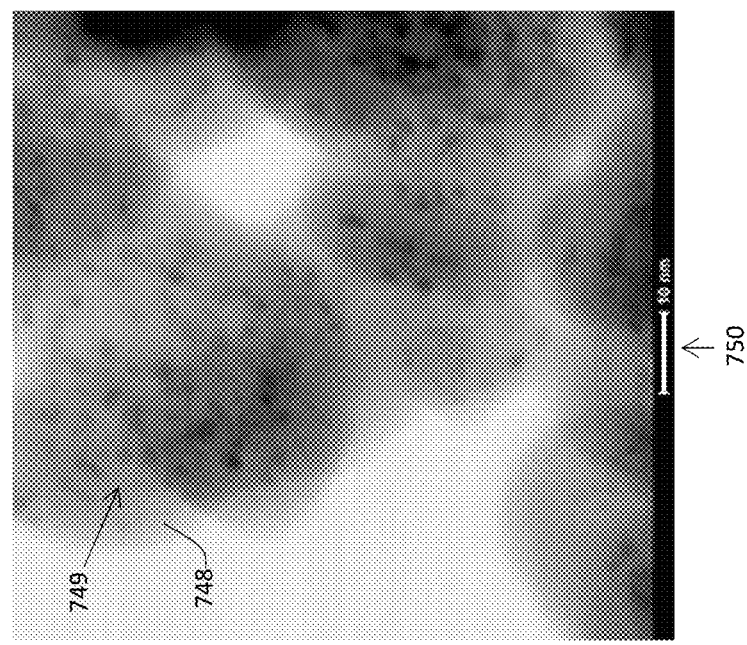
FIG. 7 illustrates an image of another embodiment generated by the method.
Figure 9:
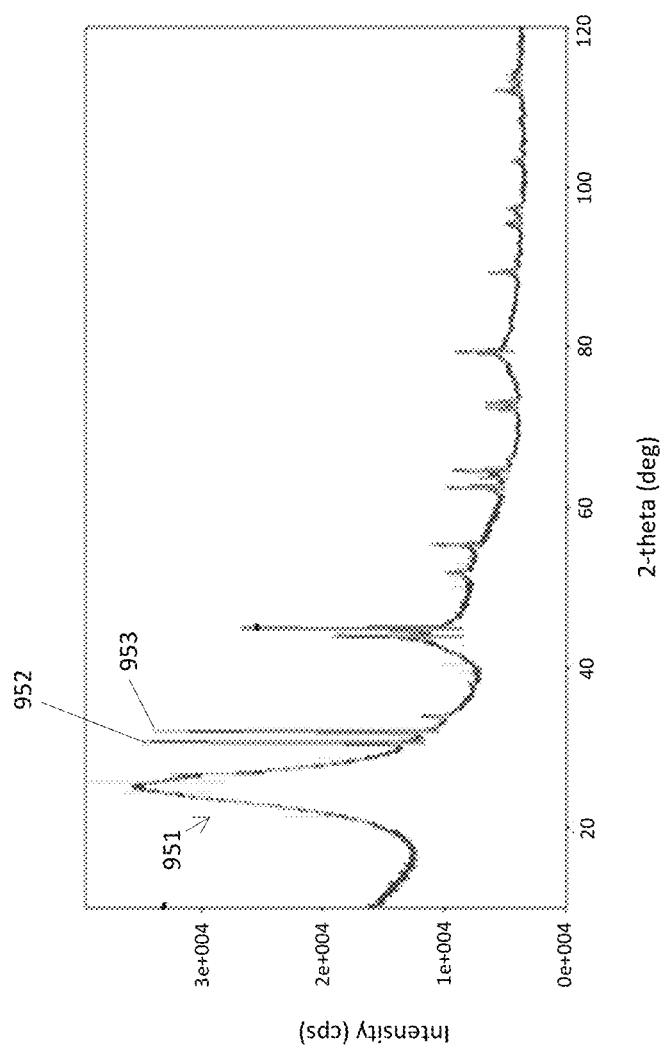
FIG. 9 illustrates an exemplary XRD pattern of an additional embodiment on an activated carbon substrate.

Without being bound by theory, higher metallic diameters such as the micron-sized Sn particles of FIG. 6 may be related to the ratio of material comprising the material precursor to carbon-oxygen surface functional groups present on nucleation sites of the carbon material. For a given amount of material precursor, utilizing a carbon support having higher specific surface areas will typically provide a higher number of sites where surface radicals may form during activation, and subsequently a higher number of nucleation sites for the formation of particles. For example, FIG. 7 illustrates a TEM bright field image at 1250000× of a material generated using the disclosed method with an $SnCl_2$ material precursor and urea as a chemical agent in a 1:2 molar ratio, and using a high specific surface area carbon black (VULCAN XC72) as the carbonaceous material. Scaling of 10 nm is indicated at 750. The underlying carbon support is an aggregate and lighter areas such as 748 indicate aggregated carbon particles of generally about 60 nm diameter. Darker spots such as those indicated generally 749 indicate the presence of Sn particles of about 2 nm diameter. FIG. 8 illustrates a TEM dark field image with scaling of 10 nm indicated at 850, the 60 nm carbon particles at 848, and the lighter 2 nm Sn particles generally at 849. An XRD of the material is illustrated at FIG. 9, with 951 indicating the base pattern from the VULCAN XC72 and 952 and 953 indicating the presence of Sn particles. Comparison of FIG. 6 with FIGS. 7 and 8 indicates the potential impact of carbon specific surface area on the resulting diameter of metallic particles formed from the process disclosed. In an embodiment, the carbonaceous material comprises carbon having a specific surface area of at least 20 $m^2/g$. In another embodiment, the mixture comprising the precursor solution, chemical agent, and carbonaceous material has a ratio of moles material precursor to specific surface area of carbon of at least $1.4(10^{-5})$ $mol/m^2$. In other embodiments, the carbonaceous material provides a total pore volume of at least 0.1 $cm^3/g$, in other embodiments at least 0.2 $cm^3/g$, and in other embodiments at least 0.3 $cm^3/g$. In certain intended application where expansion may be expected, such void space may accommodate expansion without concomitant breakage of the material in operation.

EXAMPLE

Sn/C materials were created using the process outlined below.

A commercial high surface area carbon (VULCAN XC 72) was activated. Specifically, the material was heated in air to 600° C. for 10 minutes in a tube furnace. This process reduced the weight of the carbon by approximately 11% and introduced many oxygen species on the surface of the carbon via the partial combustion of the carbon.

Sn(II) chloride, urea, and water, were mixed in the weight ratio of 1:1:20. The final mix, herein 'Sn/urea' is a homogeneous paste containing dissolved species.

The materials produced were mixed in weight ratio of 1 activated carbon:8.8 Sn/urea. The mixing was done in a mortar and pestle, by hand, and the final material had the consistency of a wet paste.

The paste was then placed in 20 $cm^3$ volume alumina boat, and the boat inserted into a quartz tube approximately 75 cm long and ~2.5 cm O.D. The tube was placed in a standard laboratory 45 cm long tube furnace, and attached via standard gas plumbing fixtures, to a gas supply system to allow control of gas identity and flow rate through the tube.

The quartz tube was arranged such that the alumina boat was in the center of the furnace, and then 99.99% $N_2$ gas was passed through the tube at ~100 sccm, via a rotameter. Concomitantly the furnace the brought to a temperature of 100° C. for an hour to remove excess water from the sample.

Two changes were made. First the gas flow rate was reduced to 5 sccm. Second the furnace temperature was increased to 800° C. The furnace took approximately 4 minutes to reach 800° C. Once that temperature was achieved it was only maintained for an additional 30 seconds. Immediately upon completion, the quartz tube containing the sample was removed from the furnace, and placed on a rack to cool. The nitrogen gas flow rate during cooling was increased to 100 sccm.

Morphology of the Sn/C materials was evaluated using transmission electron microscopy (TEM), scanning electron microscopy (SEM) and x-ray diffraction (XRD). The TEM was a Tecnai Osiris, a fully digital 200 kV S/TEM system, as well as technology for EDX signal detection/mapping at the 0.1 nm level. The SEM was a Zeiss Neon 40 with a resolution of 1.1 nm. The XRD was a Rigaku MiniFlex, a general purpose X-ray powder diffractometer with Cu tube and PDXL, Rigaku's full-function powder diffraction analysis package. Image J and JMP were employed for image/data analysis. Raman spectra were collected with a Thermo Scientific DXR Raman Microscope using a 632 nm laser at 2 mW power.

In addition to making a Sn/C material employing the protocol outlined above, a control sample was created in which no activation step was included. The process employed was otherwise identical. It was postulated that in this case few, if any, surface radicals would be produced on the carbon during the remaining steps, hence there would be no mechanism for direct chemical interaction between carbon and Sn. This would lead to the formation of large (ca. micron) Sn particle formation.

For electrochemical testing of the Sn/C composite material, laminates were constructed by taking a ratio of 80 wt. % active material, 10 wt. % carbon conductive additive (Timcal Super C65), and 10% wt. % binder (sodium carboxymethyl cellulose). A slurry was formed utilizing ultra-pure water as solvent and mixed for 20 minutes before coating onto a copper foil. After drying for 12 hours in a vacuum oven set to 80° C., electrodes with a diameter of 12 mm were punched out (active material loading ~1.5 mg cm$^2$). Coin cells (2032 type) were assembled in an Argon atmosphere (99.998%) high purity glovebox. For Li-ion half cells, lithium metal foil was used as the counter electrode, with 1.0 M LiPF$_6$ in ethylene carbonate/diethyl carbonate/dimethyl carbonate+3% fluoroethylene carbonate additive as electrolyte and Celgard 2500 as separator. For Na-ion half cells, sodium metal foil was used as the counter electrode, with 1.0 M NaPF$_6$ in ethylene carbonate/diethyl carbonate+ 3% fluoroethylene carbonate additive as electrolyte and Whatman glass fiber as separator. Cyclic voltammetry was performed at a scanning rate of 0.1 mV s-1 utilizing a Gamry 600+ instrument. All galvanostatic cycling was conducted with an Arbin cycler, with current densities ranging from 20-500 mA g$^{-1}$ in a voltage range of 0.005-1.5 V vs. either Li$^+$/Li or Na$^+$/Na. For post cycled electrode material analysis, coin cells were opened in the Argon glovebox and washed with DMC and vacuum dried to remove electrolyte and salts.

The purpose of the morphological analysis was to determine the form and structure of the Sn particles, and to contrast the particle size observed before and after cyclic battery testing. Moreover; particle size measurement serves as a test of the hypothesis that the synthesis method creates metallic Sn particles bonded directly to carbon atoms in the surface. Small particles (ca. <20 nm) are consistent with the hypothesis, whereas large particles (>1 micron) clearly indicate little or no interaction between carbon and Sn, hence the rapid sintering generally associated with the use of carbon as a support for heterogeneous catalysts.

Figure 10:
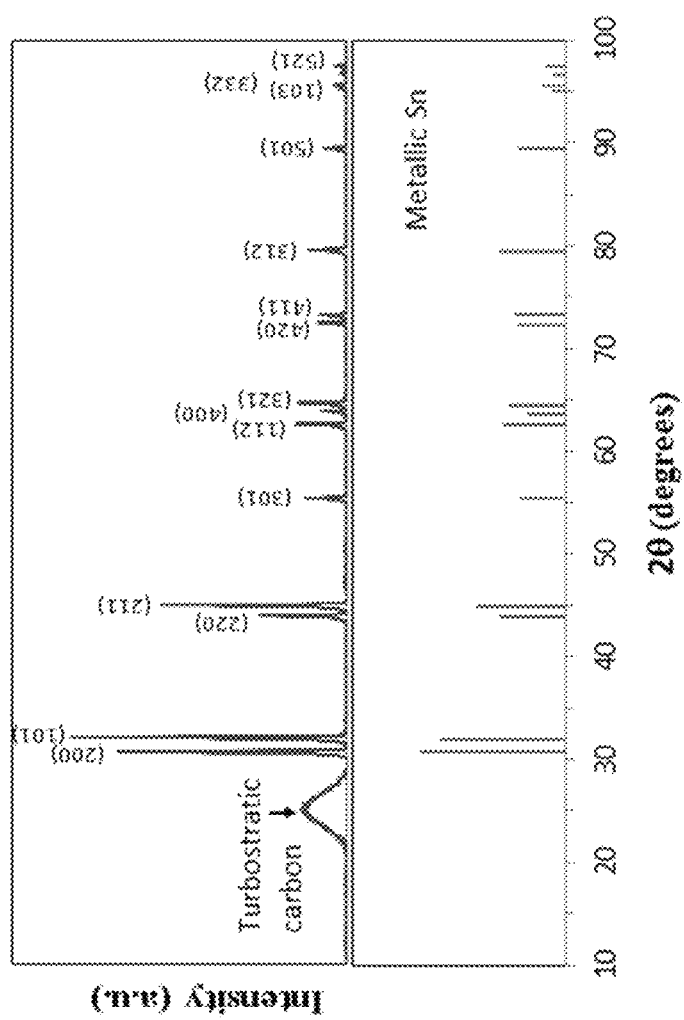
FIG. 10 illustrates an exemplary XRD pattern of a Sn/C material before cycling.

The XRD studies of the 10% Sn/C sample prepared using the standard RES protocol clearly showed virtually all of the Sn was present as metallic Sn both before (FIG. 10) and after the cyclic treatment. In contrast, the control sample was found to be primarily Sn-oxide, perhaps 20% metallic Sn. Moreover, line broadening, using Debye-Scherrer analysis, suggested the average particle size was about 15 nm for the former. The particle sizes determined using the Debye-Scherrer approach are larger than the apparent size from TEM imaging, but this difference is anticipated as the relative weighting of large and small particles is significantly different in the two methods. Consistent with the observations in the present work, the half-height Debye Scherrer method generally yields an 'average' particle size larger than that obtained from TEM analysis. In this case, as will be later shown, the TEM analysis showed a much smaller mean particle size, but both methods indicated little sintering during lithiation.

Control studies were undertaken to determine if small particles would form on carbon surfaces not properly prepared to create Sn-carbon bonding sites. In the principle control study the carbon was not 'activated'. All the steps in the protocol described in the experimental section were carried out identically, except for activation. Activation was modified; the carbon was heated in flowing nitrogen gas (99.999%), rather than air, to 600° C. Furthermore, the carbon as received was found to be hydrophobic based on the simple test: A drop of water placed on top of the carbon did not wet the sample. The water drop simply broke up into smaller drops, each more than 10 microns across and easily visible to the unaided eye. Hence, the carbon initially had few if any surface oxygen groups fresh out of the bottle, and given no air/oxygen 'activation' pretreatment, no oxygen should be found on the surface if oxygen activation is not employed. Notably, a drop of water placed on the same carbon after proper activation, that is using the unmodified oxygen activation protocol, completely disappears. The water clearly wets the material, leading to the conclusion that activation creates oxygen groups that act as primary adsorption sites.

Figure 11:
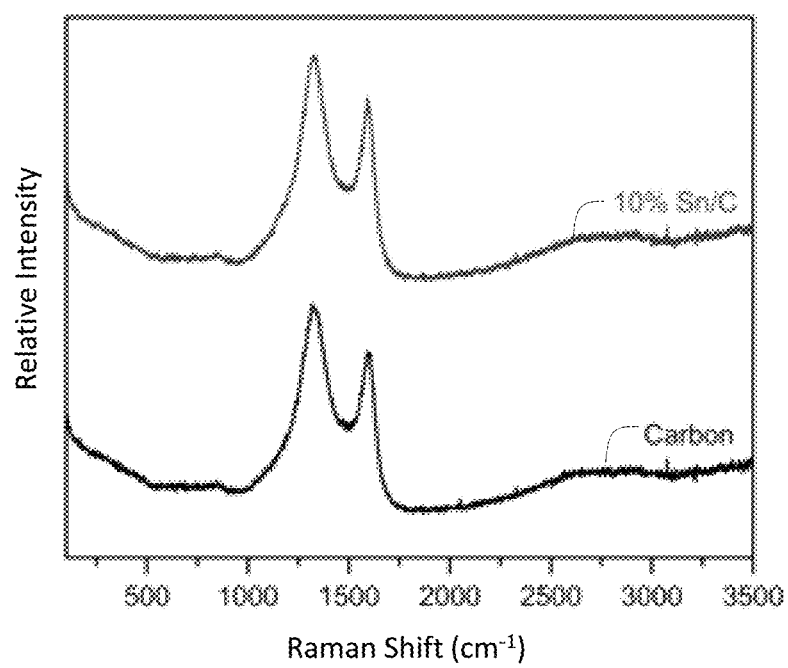
FIG. 11 illustrates Raman spectra of 10% Sn/C and a neat carbon substrate.

Raman spectra were collected for the XC-72 neat Carbon and 10% Sn/C composite produced by RES process as shown in FIG. 11. Two primary peaks are observed at 1320 cm$^{-1}$ at 1580 cm$^{-1}$ correlating to disordered carbon (sp$^3$) and graphitic carbon (sp$^2$), respectively. The ratio ($I_D/I_G$) of these peaks is 1.3 for both samples, indicating the high disorder characterization of this carbon, and that the carbon structure is not changed by the RES process. Additionally, no additional peaks are observed in the 10% Sn/C composite, which agrees with the XRD results showing no Sn oxide phase formation, as metallic Sn will not be Raman active.

The morphology of particles formed in the principle control study indicates the need for carbon activation to create highly dispersed Sn particles using the process. As shown in FIG. 6, multi-micron, spherical particles such as 645, 646, and 647 formed on the surface of carbon which was not activated. XRD studies reveal these particles are a mix of Sn oxide and metallic Sn. This is consistent with minimal bonding between the carbon surface and the tin. The carbon surface is effectively 'Tin phobic'. Upon heating the tin rapidly diffuses across the surface, leading to agglomeration and the formation of particles millions of times larger, by volume, than those found to form on activated carbon as described below.

Both SEM and TEM were employed to the study of particles formed by the RES method on activated carbon. Although XRD and chemical analysis clearly showed significant Sn on the carbon, a thorough SEM investigation revealed no apparent Sn structures. This is consistent with all Sn structures being too small and highly dispersed for easy observation using SEM, although EDS analysis in the SEM corroborated the Sn presence. Moreover, given the high temperature encountered, 800° C., it suggests that the Sn metal is strongly bonded to the carbon surface. Only strongly bonded metal by carbon would resist sintering at 800° C., as described in the reaction mechanism in the discussion section.

Figure 13:
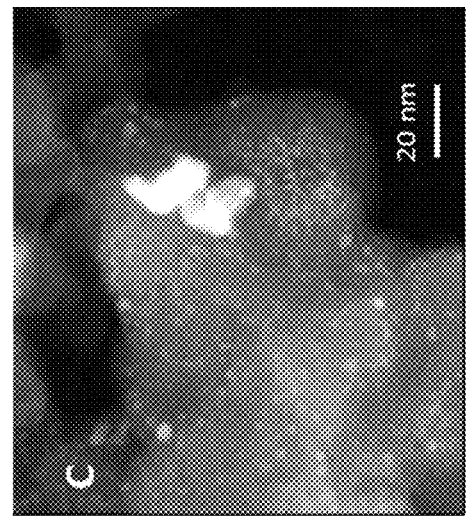
FIG. 13 illustrates an image of an Sn/C material after cycling.
Figure 12:
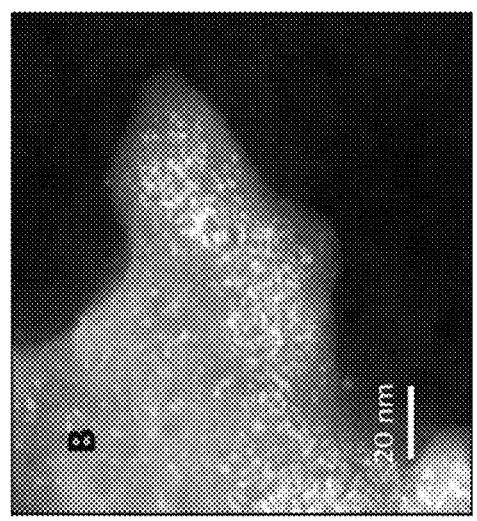
FIG. 12 illustrates an image of an Sn/C material before cycling.

HAADF STEM analysis was consistent with the XRD, and SEM, indicating that only very small Sn particles were present on the carbon surface. None of the particles before battery testing appear to be larger than 5 nm (FIG. 12). The images show after more than 100 cycles of battery testing there is some level of particle sintering (FIG. 13). Some particles are 'large' of the order 10 nm across, but the majority are still less than 5 nm in size. Still, there is no evidence of 'pulverization'. Thus, qualitatively the XRD and the TEM results are consistent, leaving little doubt that very small metallic Sn particles form following the standard RES protocol, and that limited growth does occur during battery testing.

Figure 14:
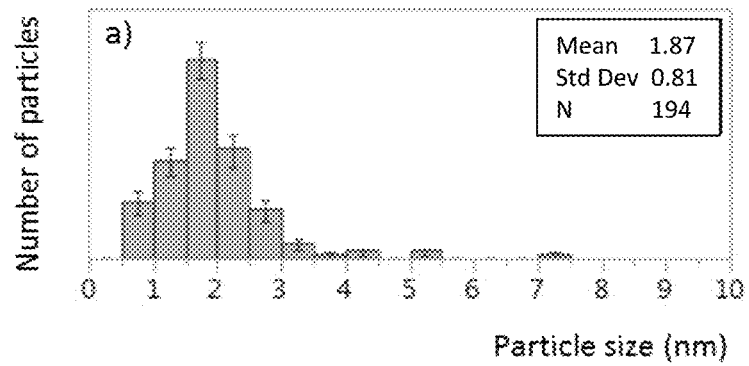
FIG. 14 illustrates particle size distributions generated from the TEM images before cycling.
Figure 15:
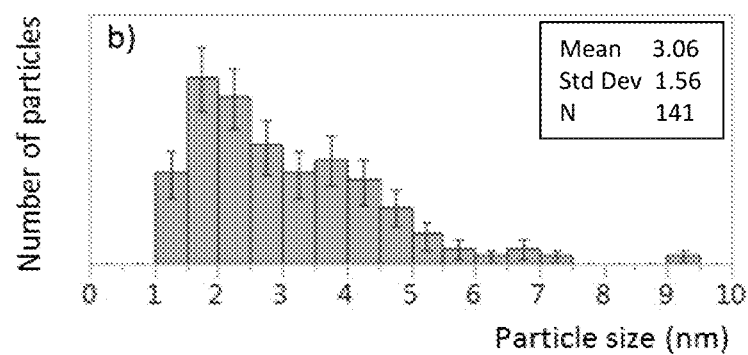
FIG. 15 illustrates particle size distributions generated from the TEM images after cycling.

The particle size distributions were measured from the TEM images. Software Image J was employed to measure the particles and JMP to generate histograms and perform the statistical analysis. A mean value close to 2 nm (FIG. 14) was obtained for the sample as prepared when the carbon was activated, while a mean of 3 nm was observed for cycled specimens (FIG. 15). It is worth noting that despite the before and after cycling particle size values being very close, the cycled sample does show a tail in the PSD that extended up to 10 nm. These values are much smaller than the ones calculated from XRD FWHM analysis.

Figure 17:
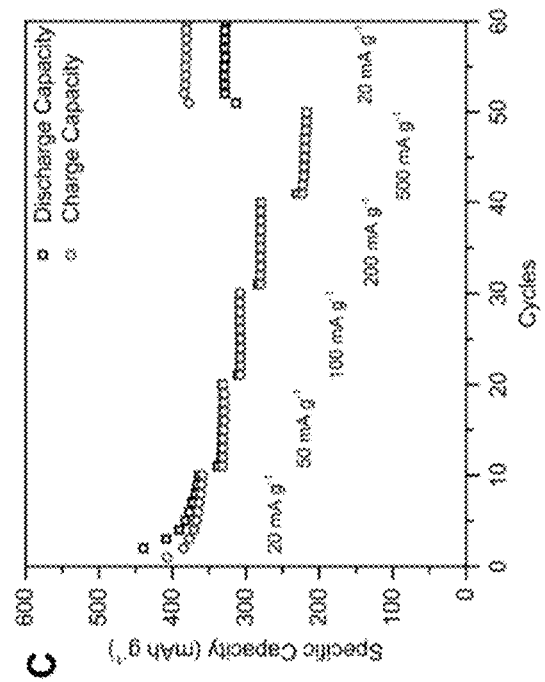
FIG. 17 illustrates Galvanostatic cycling at various current densities.
Figure 16:
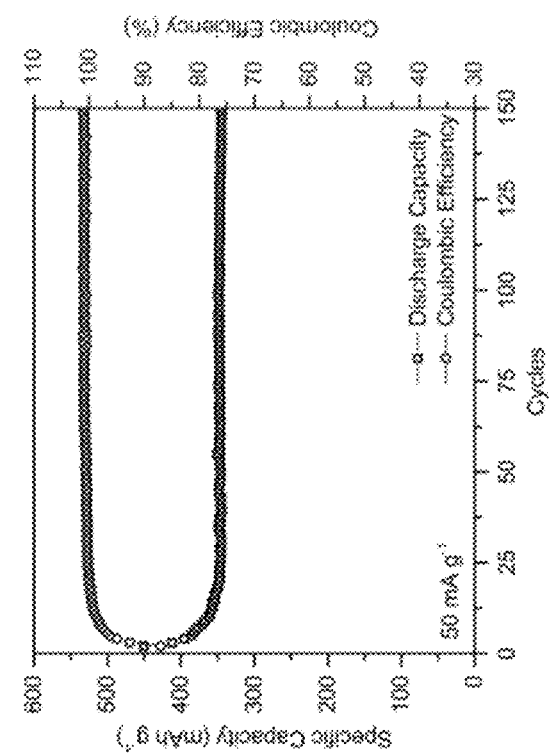
FIG. 16 illustrates long-term Galvanostatic cycling at 50 mA g$^{-1}$ current density.

The 10% Sn/C electrode was tested in a Li-ion half cell for electrochemical performance. Formation cycles were analyzed using cyclic voltammetry, where a few peaks were observed in first discharges at 0.9 V, 0.45 V, 0.3 V, and 0 V, likely due to initial SEI formation, Sn alloying with Li, and intercalation into the carbon support. Subsequent cycles showed less features, with a charge peak at 0.7 V but otherwise smooth profile due to the large percentage of amorphous carbon in the composite. Galvanostatic cycling test at constant current is shown in FIG. 16, and shows after significant capacitance loss in the first ~10 cycles, a stable capacity of 350 mAh g$^{-1}$ at 50 mA g$^{-1}$ is achieved. Cycling at various current densities is shown in FIG. 17. From a capacity of 370 mAh g$^{-1}$ at 20 mA g$^{-1}$ to 220 mAh g$^{-1}$ at 500 mA g$^{-1}$, the material showed exceptional rate kinetics due to the high surface area carbon and small Sn particle size enabling rapid lithiation/delithiation.

In order to explain more precisely the anticipated chemistry of generation of Sn/C electrodes using the disclosed method it is necessary to present a condensed description of a widely accepted model of the creation of unsaturated, 'surface radical', sites on carbon. Generally, carbon, either graphitic or turbostratic, surfaces consist primarily of basal planes in which all atoms are strongly bonded to three nearest neighbors. Little chemistry takes place here. In contrast, at defect sites, including edges, there are surface sites capable of chemistry. In particular, O atoms, OH complexes, etc. often bond to unsaturated carbon atoms at these sites. It is well documented that O-groups, found at edges and defects, serve as the nucleation points for many processes including water adsorption, and metal particle formation, but not strong bonding. However; there are specific 'recipes' for removing O-species from these sites, such as heating to 950 C in flowing inert gas, that remove C-atoms as well, and concomitantly create 'dangling bonds' or 'surface radicals'. The surface radicals so formed have been shown to form strong bonds to metal atoms. See e.g Phillips et al., "Calorimetric study of oxygen adsorption on activated carbon," *Thermochimica Acta* 312 (1998); see also Hegenberger et al., "Evidence of Strong Interaction between Iron Particles and an Activated Carbon Support," *J. Phys. Chem.* 91 (1987); see also Chen et al., "Effect of Support Pretreatments on Carbon-Supported Fe Particles," *J. Phys. Chem.* 91 (1987); see also Jun-Min et al, "Effect of Carbon Support Pretreatment on Structure and Performance of Pt/C Electrocatalysts," *Chinese Journal of Inorganic Chemistry* 31 (2015).

To fully understand more the steps used in the synthesis, following is a brief review of recipes that remove oxygen from carbon surfaces, yet do not create surface radicals. For example, treating a carbon surface in hydrogen, at temperatures above 950° C. creates a hydrophobic, chemically inert carbon. It is believed that the high temperature not only strips the oxygen groups from the surface, but also reacts with all 'surface radicals' created by the removal of oxygen to create methane. No highly reactive surface sites remain. One of the simplest tests of this postulate is a test of hydrophobicity. A carbon surface without oxygen groups or surface radicals is hydrophobic.

It is believed that during synthesis of the Sn/carbon electrodes described here, two steps are combined into a single rapid synthesis. Specifically, reducing radicals produced via urea decomposition attack oxygen groups on the carbon surface, leading to the formation of volatile, stable species. This process creates carbon 'surface radicals'. Almost immediately these surface radicals form strong bonds with metal atoms. These metal atoms are generated via the decomposition of material precursor molecules, a process that is thermally driven and takes place concomitantly with the thermal decomposition of the urea.

All the data presented is consistent with the process outlined in the above paragraph. In particular these observations are consistent with this model: i) Very small Sn particles form. ii) The small Sn particles are stable even at 800° C. iii) They remain stable during use as a Li ion electrode over hundreds of charge/discharge cycles and the accompanying expansion/contraction. iv) The same synthesis carried out on $N_2$ activated carbon (control study) (FIG. 12) does not produce highly dispersed Sn particles, but rather micron scale, spherical Sn particles.

Evidence for the various claims regarding particle size, stability in battery use, etc. are clearly found in the XRD, TEM and SEM data provided. Indeed, the existence of very small Sn particles (<15 nm), even after a synthesis that involves a step at 800° C., is found from XRD (FIG. 10), and TEM studies (FIGS. 7 and 8). The data also shows that there is limited growth of the metal particles during battery testing. XRD spectra of 10% Sn/C interpreted using the standard half-height Debye-Scherrer method indicates the average particle increases from ~15 nm to ~20 nm during testing. TEM images the particles directly, and it appears that the particles are smaller than predicted based on XRD. Indeed, initially no particles larger than 5 nm are observed, and the average appears to be significantly smaller than the one calculated from FWHM approach. After cycling particle sizes have a wider distribution, however still measure <10 nm. There is also indirect evidence of very small particles from SEM studies: no particles are observed, suggesting the particles are below the resolution size limit of the instrument.

Further demonstration of the consistency of the observed data with the postulated model of particle formation is found in the large particles, six orders of magnitude larger in volume, that form on the un-activated support (FIG. 6). This is consistent with one of the postulated requirements for strong and direct chemical bonding and concomitant stabilization of nm scale particles: 'surface radicals' must form on the carbon. In the absence, initially, of a significant quantity of oxygen groups on the carbon, as testified by the hydrophobic character of the carbon, no surface radicals can be formed by removal of those groups by gas phase radicals. In the absence of these radicals, bonding between and the carbon surface is very weak, leading to rapid sintering and concomitantly the formation of micron scale particles. SEM was valuable in demonstrating the very different Sn particle growth process that occurs when not all the requirements for producing nano scale Sn are present in the synthesis.

It is observed that on the 10% Sn/C the capacity is stable, after losses in the first five formation cycles, through more than 150 charge/discharge cycles. In general, a loss in capacity corresponds to a simultaneous sintering or mechanical pulverization of electrode through Sn volumetric changes. No capacity loss suggests no sintering after initial stabilization. It is possible some of the Sn is initially not well anchored when deposited, and this fraction can sinter to form larger particles and increase SEI formation for the first few cycles. Indeed, there is a bimodal particle size distribution after charge/discharge testing. It is completely possible these large particles form in the first few cycles of testing. The majority of the Sn, in contrast, is in a particle form (~5 nm) which appears to be remarkably stable. This model explains the observed bimodal distribution as well as the observed electrode stability for this typically dynamic system.

The battery data can be shown to be consistent with a nearly 100% Sn 'effectiveness' model, that is very small and stable Sn particles. Specifically, the control study of Li uptake on activated, but metal free carbon, shows a capacity of ~280 mAh/gm. The literature indicates that Sn has a theoretical capacity of ~1000 mAh/g. Normalizing a 10 wt % Sn/C sample to 1 gram indicates the contribution to capacity i) from carbon (0.9 g) should be 252 mAh, and ii) the contribution from Sn should be 100 mAh. Added together this predicts the electrode should have a capacity of ~350 mAh/g, a value very close to that observed (FIG. 5). Additionally, the EIS study demonstrated that the well distributed, small Sn particles decreased the charge transfer resistance of the electrode, by augmenting conductive pathways for $Li^+$ and electrons, before and after SEI formation.

Thus, provided here is a method for generating a metal-carbon bonded material using a chemical process. The method activates a carbon support using an oxygen-comprising gas in order to generate oxygen groups on the carbon substrate and greatly mitigate or eliminate hydrophobicity, followed by mixing the activated carbon with a solution comprising a material precursor and a chemical agent. The material precursor is typically a salt such as $SnCl_2$, and the chemical agent is a substance such as urea which thermally decomposes to generate reducing gases such as CO, $H_x$, $NH_x$, or mixtures thereof. The mixture is heated to a first temperature below the decomposition temperature of the chemical agent in order to drive off some portion of the solution solvent, followed by heating in an inert, nonreactive atmosphere at a temperature greater than the decomposition temperature of the chemical agent and the material precursor. Decomposition of the chemical agent generates reducing gases which remove the surface groups from the carbon support leaving metal nucleation sites having dangling bonds, allowing material such as metal from the material precursor to nucleate and bond to the sites. In certain embodiments, the method produces a plurality of metal particles having an average diameter of less than about 20 nm dispersed on and strongly bonded to the underlying carbon support. In other embodiments the method generates nanoparticles particles comprised of metallic tin (Sn) strongly bonded to the carbon support. Such a material has high use in certain applications, such as an electrode material for Li+ and other batteries which operate through intercalation/deintercalation processes.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of generating a heterogeneous carbon-bonded material comprising:
   oxidizing a carbonaceous material by contacting the carbonaceous material and an oxidizing agent for a time sufficient to generate chemisorption of oxygen on the carbonaceous material, thereby generating an activated material, where the carbonaceous material comprises a carbon support;
   generating a mixture comprising a precursor solution and the activated material, where the precursor solution comprises a solvent and a material precursor and a chemical agent as solutes, and where the chemical agent produces a reducing gas upon thermal decomposition, where the reducing gas removes surface groups from a surface of the activated material to expose metal nucleation sites on the surface that are exposed to the precursor solution due to hydrophilic conditions at carbon sites of the carbonaceous material, and where the reducing gas comprises at least one of CO, $H_x$, $NH_x$, or mixtures thereof, where x is greater than or equal to 1;
   evaporating some portion of the solvent within the precursor solution by heating the mixture to a first temperature in an inert atmosphere, where the first temperature is less than a decomposition temperature of the material precursor and less than a decomposition temperature of the chemical agent, thereby generating a precursor mix;
   generating a reactive gas and a metal by heating the precursor mix to a second temperature in an unreactive atmosphere, where the second temperature is greater than the decomposition temperature of the chemical agent, greater than the decomposition temperature of the metal precursor, and less than a combustion temperature of the carbonaceous material;
   adjusting an amount of the material precursor, an amount of the chemical agent, an amount of the solvent, and the specific surface area of the carbonaceous material to minimize a mean diameter of particles of the metal from the material precursor to a mean diameter of less than 5 nm; and
   contacting the reactive gas and the activated material to form the heterogeneous carbon-bonded material that comprises the particles of the metal having the mean diameter of less than 5 nm, where the heterogeneous carbon-bonded material comprises carbon from the carbonaceous material and the particles of the metal that are directly bonded at the metal nucleation sites.

2. The method of claim 1, where oxidizing the carbonaceous material comprises heating the carbonaceous material in an atmosphere comprising oxygen to a temperature of at least 250° C. for the time sufficient to generate chemisorption of oxygen on the carbonaceous material, thereby generating the activated material.

3. The method of claim 2, where the solvent is water, and where the first temperature is greater than 100° C.

4. The method of claim 3, where carbon comprises greater than 80 weight percent of the carbonaceous material.

5. The method of claim 4, where the carbonaceous material has a specific surface area of at least 20 $m^2/g$ and a total pore volume of at least 0.3 $cm^3/g$.

6. The method of claim 5, where the material precursor is a salt.

7. The method of claim 5, where the metal comprising the material precursor comprises at least one of tin, silicon, or germanium.

8. The method of claim 7, where the particles comprises at least one of tin, silicon, or germanium, and the method further comprising:
generating a second mixture where the second mixture comprises the heterogeneous carbon-bonded material and a binder; and
covering a substrate surface of a conducting substrate with the second mixture where the conducting substrate has an electrical conductivity greater than $10^3$ S/cm.

9. The method of claim 5, where the material precursor comprises an anion selected from the group consisting of chloride, acetate, formate, nitrate, chloride, sulfate, oxychloride, phosphate, or mixtures thereof.

10. The method of claim 5, where the mixture comprising the material precursor and the activated material has a ratio of moles material precursor to specific surface area of activated material of at least $1.4(10^{-5})$ mol/m$^2$.

11. The method of claim 5, where a molar ratio of the chemical agent to the material precursor is greater than one.

12. The method of claim 11, where the chemical agent comprises a compound comprising $NH_z$ where z is greater than or equal to 1.

13. The method of claim 12, where the decomposition temperature of the chemical agent and the decomposition temperature of the material precursor is from about 400° C. to about 1200° C.

14. A method of generating a heterogeneous carbon-bonded material comprising:
heating a carbonaceous material in an atmosphere comprising oxygen to a temperature of at least 250° C. for a time sufficient to generate chemisorption of oxygen on the carbonaceous material, where carbon comprises at least 50 weight percent of the carbonaceous material and where the carbonaceous material comprises a carbon support and has a specific surface area of at least 20 m$^2$/gram, thereby generating an activated material;
generating a mixture comprising an aqueous precursor solution and the activated material, where the aqueous precursor solution comprises water as a solvent and a material precursor and a chemical agent as solutes, and where the material precursor comprises a metal, and where the chemical agent produces a reducing gas upon thermal decomposition, where the reducing gas removes surface groups from a surface of the activated material to expose metal nucleation sites on the surface that are exposed to the precursor solution due to hydrophilic conditions at carbon sites of the carbonaceous material, and where the reducing gas comprises at least one of CO, $H_x$, $NH_x$, or mixtures thereof, where x is greater than or equal to 1, and where a decomposition temperature of the chemical agent and a decomposition temperature of the metal precursor is from about 400° C. to about 1200° C.;
evaporating some portion of the solvent within the precursor solution by heating the mixture to a first temperature in an inert atmosphere, where the first temperature is greater than 100° C. and less than a decomposition temperature of the material precursor and less than a decomposition temperature of the chemical agent, thereby generating a precursor mix;
generating a reactive gas and a metal by heating the precursor mix to a second temperature in an unreactive atmosphere, where the second temperature is greater than the decomposition temperature of the chemical agent, greater than the decomposition temperature of the material precursor, and less than a combustion temperature of the carbonaceous material;
adjusting an amount of the material precursor, an amount of the chemical agent, an amount of the solvent, and the specific surface area of the carbonaceous material to minimize a mean diameter of particles of the metal from the material precursor to a mean diameter of less than 5 nm; and
contacting the reactive gas and the activated material to form the heterogeneous carbon-bonded material that comprises the particles of the metal having the mean diameter of less than 5 nm, where the heterogeneous carbon-bonded material comprises carbon from the carbonaceous material and the particles of the metal that are directly bonded at the metal nucleation sites.

15. The method of claim 14, where the metal comprising the material precursor comprises at least one of tin, silicon, or germanium.

16. The method of claim 15, where the mixture comprising the material precursor and the activated material has a ratio of moles material precursor to specific surface area of activated material of at least $1.4(10^{-5})$ mol/m$^2$.

17. The method of claim 16, where the particles comprises at least one of tin, silicon, or germanium, and the method further comprising:
generating a second mixture where the second mixture comprises the heterogeneous carbon-bonded material and a binder; and
covering a substrate surface of a conducting substrate with the second mixture where the conducting substrate has an electrical conductivity greater than $10^3$ S/cm.

18. The method of claim 17, where the metal comprising the material precursor comprises tin.

19. The method of claim 18, where the chemical agent comprises urea.

* * * * *